(12) United States Patent
Furuya et al.

(10) Patent No.: US 10,951,085 B2
(45) Date of Patent: Mar. 16, 2021

(54) RECORDING APPARATUS

(71) Applicant: SEIKO EPSON CORPORATION, Tokyo (JP)

(72) Inventors: Kenichi Furuya, Shiojiri (JP); Sho Aruga, Chino (JP); Kazuhisa Takeda, Shiojiri (JP); Kazuo Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 390 days.

(21) Appl. No.: 15/912,071

(22) Filed: Mar. 5, 2018

(65) Prior Publication Data

US 2018/0262079 A1 Sep. 13, 2018

(30) Foreign Application Priority Data

Mar. 13, 2017 (JP) .............................. JP2017-047041
Aug. 24, 2017 (JP) .............................. JP2017-160890

(51) Int. Cl.
*H02K 5/22* (2006.01)
*B41J 13/03* (2006.01)
*H02K 15/14* (2006.01)

(52) U.S. Cl.
CPC ................ *H02K 5/22* (2013.01); *B41J 13/03* (2013.01); *H02K 15/14* (2013.01)

(58) Field of Classification Search
USPC .............................. 347/108, 19, 49; 101/479
See application file for complete search history.

(56) References Cited

U.S. PATENT DOCUMENTS

| | | | | |
|---|---|---|---|---|
| 2,946,094 A | * | 7/1960 | Kawasaki | F16C 33/201 264/137 |
| 4,426,593 A | * | 1/1984 | Chernoff | H02K 5/00 248/669 |
| 4,531,700 A | * | 7/1985 | Robinson | B41J 29/02 248/672 |
| 4,832,306 A | * | 5/1989 | Bossack | B41J 29/02 248/674 |
| 5,111,715 A | * | 5/1992 | Farris | B60R 11/00 310/83 |
| 7,042,478 B2 | * | 5/2006 | Bouverie | B41J 2/325 347/177 |
| 2005/0160928 A1 | * | 7/2005 | Motard | B41F 13/44 101/217 |
| 2008/0168914 A1 | * | 7/2008 | Kark | B41F 13/20 101/216 |

(Continued)

FOREIGN PATENT DOCUMENTS

JP 2015-226380 A 12/2015

*Primary Examiner* — Jake Cook
*Assistant Examiner* — T. Scott Fix
(74) *Attorney, Agent, or Firm* — Workman Nydegger

(57) ABSTRACT

A recording apparatus including a motor mounting frame in which, in an attached state, a drive shaft of a motor is projected to a front side with respect to a frame surface on the front side, and in the attached state, while a frame surface on a rear side and the motor oppose each other, the motor is attached to the motor mounting frame. The recording apparatus includes a frame attaching portion to which the motor mounting frame is attached. In the attached state, at least a portion of a fastening member that fixes the frame attaching portion is exposed when viewing the frame surface on the front side from the front, and the fastening member is at an attachable/detachable position.

10 Claims, 13 Drawing Sheets

(56) References Cited

U.S. PATENT DOCUMENTS

| | | | |
|---|---|---|---|
| 2008/0229958 A1* | 9/2008 | Catelli | B31F 1/07 101/479 |
| 2009/0179971 A1* | 7/2009 | Hibbard | B41J 29/02 347/85 |
| 2015/0258827 A1* | 9/2015 | Iwaya | B41J 2/01 347/108 |
| 2015/0349602 A1 | 12/2015 | Nishinakama | |

* cited by examiner

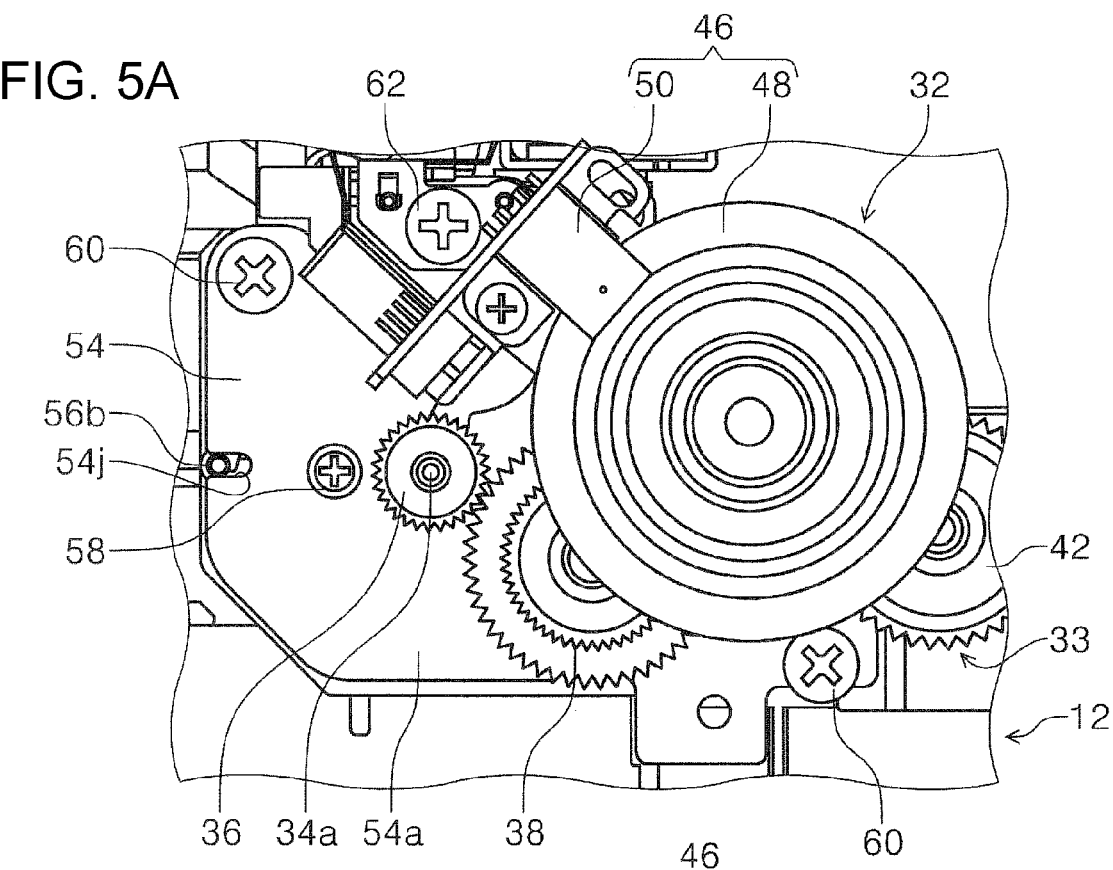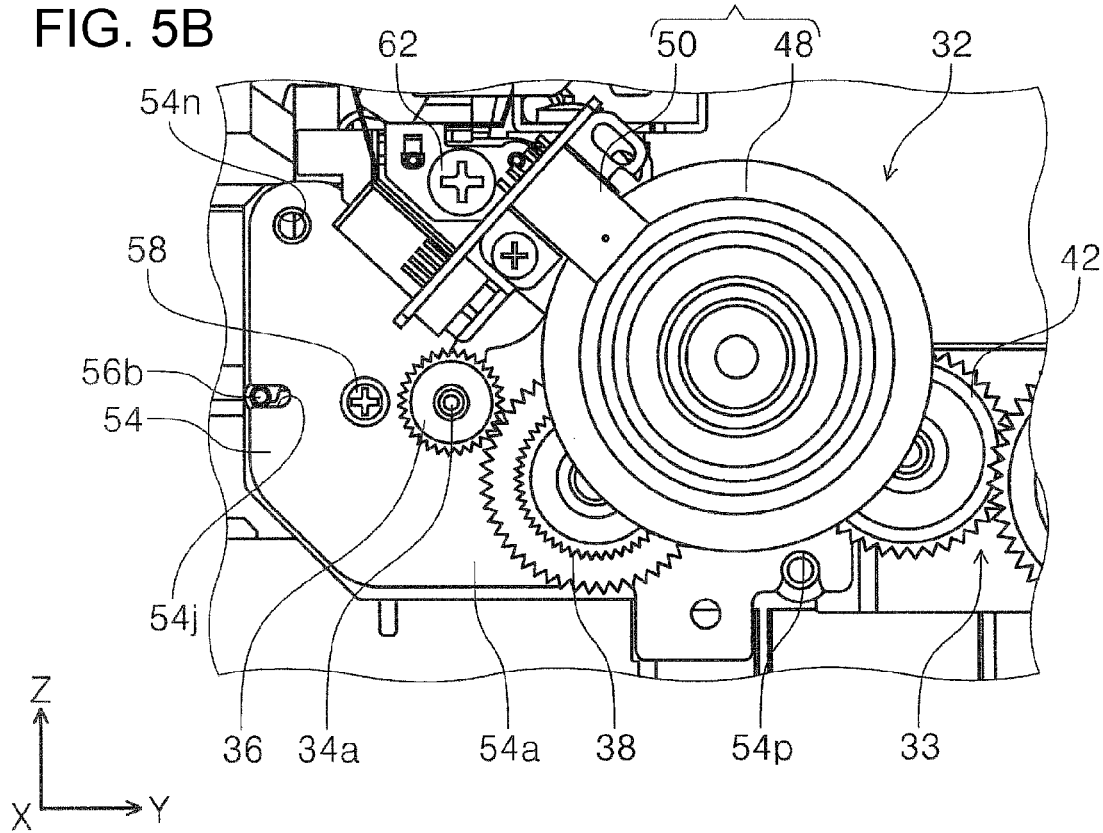

RECORDING APPARATUS

BACKGROUND

1. Technical Field

The present disclosure relates to a recording apparatus that performs recording on a medium.

2. Related Art

A recording apparatus, a representative example of which is a printer, is provided with at least a motor serving as a power source that drives a component, such as a motor that drives a transport roller that transports a recoding sheet serving as an example of a medium, and a motor that drives a carriage including a recording head.

The motor is mounted on a frame that is dedicated to constitute a base of the printer (see JP-A-2015-226380, for example).

Components such as gears and an encoder scale that detects rotation is provided around the motor. Accordingly, the components around the motor, such as the gears and the encoder scale, need to be dismounted when the motor is replaced. However, there is a case in which a gear alone cannot be simply dismounted, for example, in a case in which a gear is press-fitted and fixed to a rotating shaft of the transport roller. Consequently, in the above example, in addition to the gear, the transport roller needs to be dismounted, and moreover, a need to dismount other components related to the transport roller occurs; accordingly, the motor replacement operation becomes highly complicated and replacement operation takes a long period of time.

SUMMARY

An advantage of some aspects of the disclosure is that a recording apparatus is provided in which work efficiency during replacement of a motor has been taken into consideration.

A recording apparatus according to an aspect of the present disclosure to overcome the above issue includes a motor, a motor mounting frame that is a frame on which the motor is mounted, the motor mounting frame including a first frame surface located on a front side in an attached state and a second frame surface located on a rear side in the attached state, in which a drive shaft of the motor is projected towards the front side with respect to the first frame surface and the motor is mounted while in a state in which the second frame surface and a main body portion of the motor oppose each other, and a frame attaching portion to which the motor mounting frame is attached while in a state in which the second frame surface of the motor mounting frame opposes the frame attaching portion. In the recording apparatus, in the attached state, at least a portion of a fastening member that fixes the motor mounting frame to the frame attaching portion is exposed when viewing the first frame surface from the front side, and is at an attachable/detachable position.

According to the above, the motor is provided on the frame attaching portion with the motor mounting frame in between, and at least a portion of the fastening member that fixes the motor mounting frame to the frame attaching portion is exposed when, in the attached state, the first frame surface is viewed from the front and the fastening member is at an attachable and detachable position. Even in a state in which the degree of freedom of dismounting the components around the motor is low, the fixed state of the motor mounting frame with respect to the frame attaching portion can at least be cancelled; consequently, work efficiency when replacing the motor is improved.

It is preferable that the recording apparatus according to the aspect of the disclosure further include a gear set that rotates by receiving motive force from the motor, an encoder scale attached to at least one of gears included in the gear set, the encoder scale constituting a detection member that detects rotation, in which, in the attached state, the fastening member is positioned outside the gear set and the encoder scale when viewing the first frame surface from the front side.

According to the above, since in the attached state, the fastening member is positioned outside the gear set and the encoder scale when viewing the first frame surface from the front side, the attaching and removing of the fastening member can be performed more readily.

It is preferable that in the recording apparatus according to the aspect of the disclosure, the main body portion of the motor include, around the drive shaft, a cylindrical portion that has a diameter that is smaller than an outside diameter of the main body portion, in which in the recording apparatus, in the attached state, the pinion gear is attached to the drive shaft of the motor, and the motor mounting frame includes a first hole portion in which, in the attached state, the cylindrical portion fits and through which the drive shaft of the motor is projected towards the front side with respect to the first frame surface, the first hole portion having a diameter that is smaller than an outside diameter of the pinion gear, a second hole portion that has a diameter that is larger than the outside diameter of the pinion gear, and a cut-out portion that connects the first hole portion and the second hole portion to each other, the cut-out portion having a width that is larger than an outside diameter of the drive shaft of the motor.

According to the above, even in a case in which the pinion gear is provided on the drive shaft of the motor in a fixed manner (in a not easily dismounted manner), by using the second hole portion while the pinion gear is attached to the drive shaft of the motor, the drive shaft of the motor can be passed through to the first hole portion that is a fixing position thereof with respect to the motor mounting frame; accordingly, mounting and dismounting work of the motor is facilitated.

It is preferable that in the recoding apparatus according to the aspect of the disclosure, the pinion gear is impregnated with a lubricant.

According to the above, since the pinion gear is impregnated with a lubricant, for example, sliding friction in the engagement between the pinion gear and the gear engaged with the pinion gear can be reduced, and generation of abrasion powder between the pinion gear and the gear engaged with the pinion gear can be suppressed.

It is preferable that in the recording apparatus according to the aspect of the disclosure, the motor mounting frame be slidable in a direction parallel to the second frame surface while in a state in which the second frame surface is in contact with the frame attaching portion, and become detachable from the frame attaching portion by being slid.

According to the above, the motor mounting frame can be dismounted readily, and the replacement operation of the motor is facilitated.

It is preferable that in the recording apparatus according to the aspect of the disclosure, the frame attaching portion include a restricting portion that restricts a position of the motor mounting frame in a direction parallel to the second frame surface, and the restricting portion be provided on a deformation portion capable of elastic deformation in a direction that intersects the second frame surface.

According to the above, since the restricting portion that restricts the position of the motor mounting frame is provided on the deformation portion that is capable of being elastic deformed, the restriction of the position of the motor mounting frame restricted with the restricting portion can be canceled with a simple operation, and the motor mounting frame can be dismounted in a further readily manner.

It is preferable that in the recoding apparatus according to the aspect of the disclosure, in the attached state, the encoder scale is provided at a position on a frontmost side with respect to the gear set.

According to the above, since in the attached state, the encoder scale is provided at a position on the frontmost side with respect to the gear set, one can expect the encoder scale that is easily broken to be easily dismounted first, and the encoder scale to be prevented from being broken when dismounting the motor.

BRIEF DESCRIPTION OF THE DRAWINGS

The invention will be described with reference to the accompanying drawings, wherein like numbers reference like elements.

FIGS. 5A and 5B are front views illustrating states in which fastening members are attached to and removed from the motor mounting frame.

DESCRIPTION OF EXEMPLARY EMBODIMENTS

Figure 1:
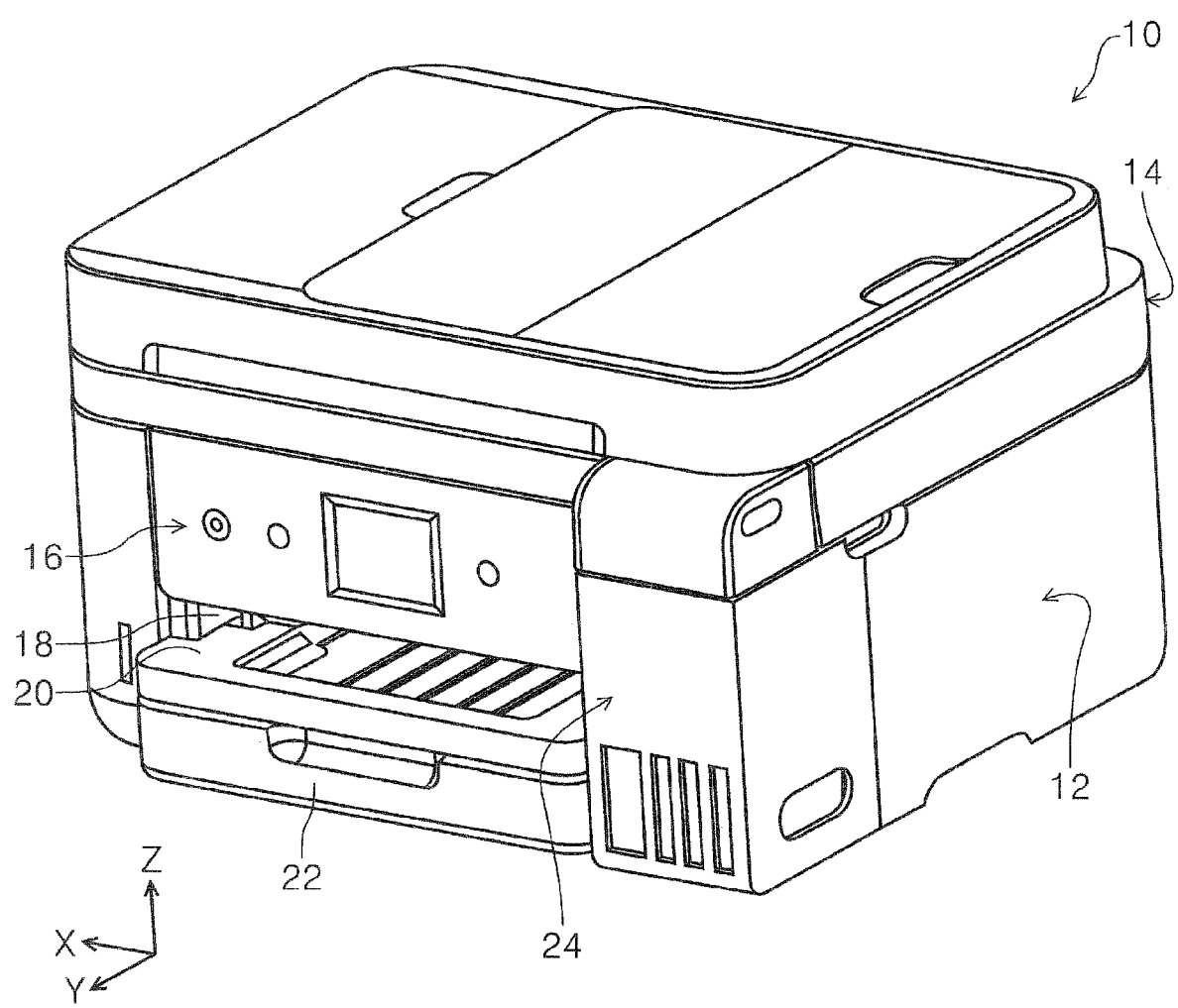
FIG. 1 is an external perspective view of a printer according to an exemplary embodiment of the disclosure.

Hereinafter, an exemplary embodiment of the disclosure will be described with reference to the drawings. Note that in the exemplary embodiment and modifications of the exemplary embodiment, components that are the same will be denoted with the same reference numerals. Description of such components will be given in only the exemplary embodiment and will be omitted in the succeeding modifications of the exemplary embodiment.

Figure 2:
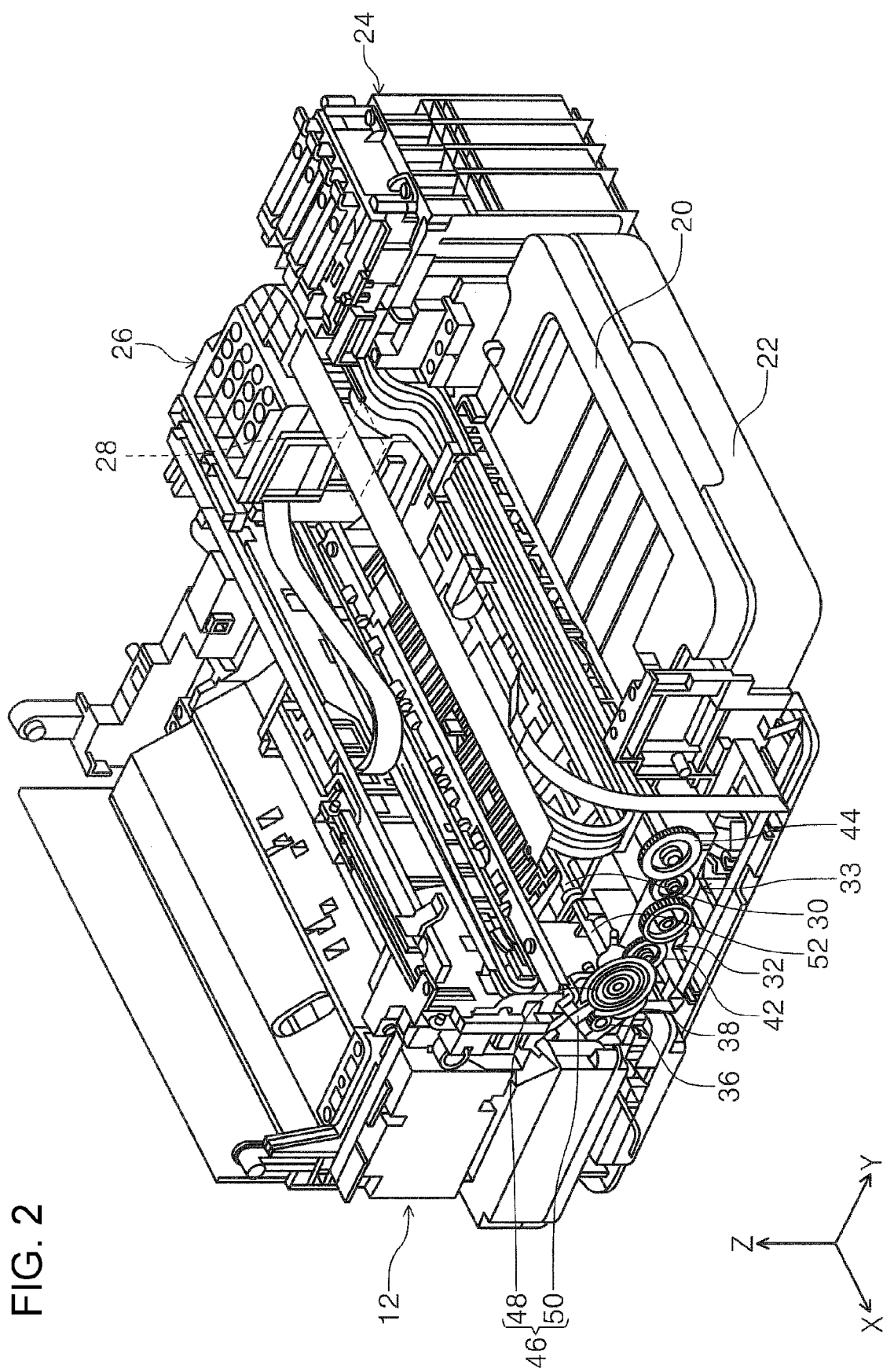
FIG. 2 is a perspective view of an apparatus main body.
Figure 3:
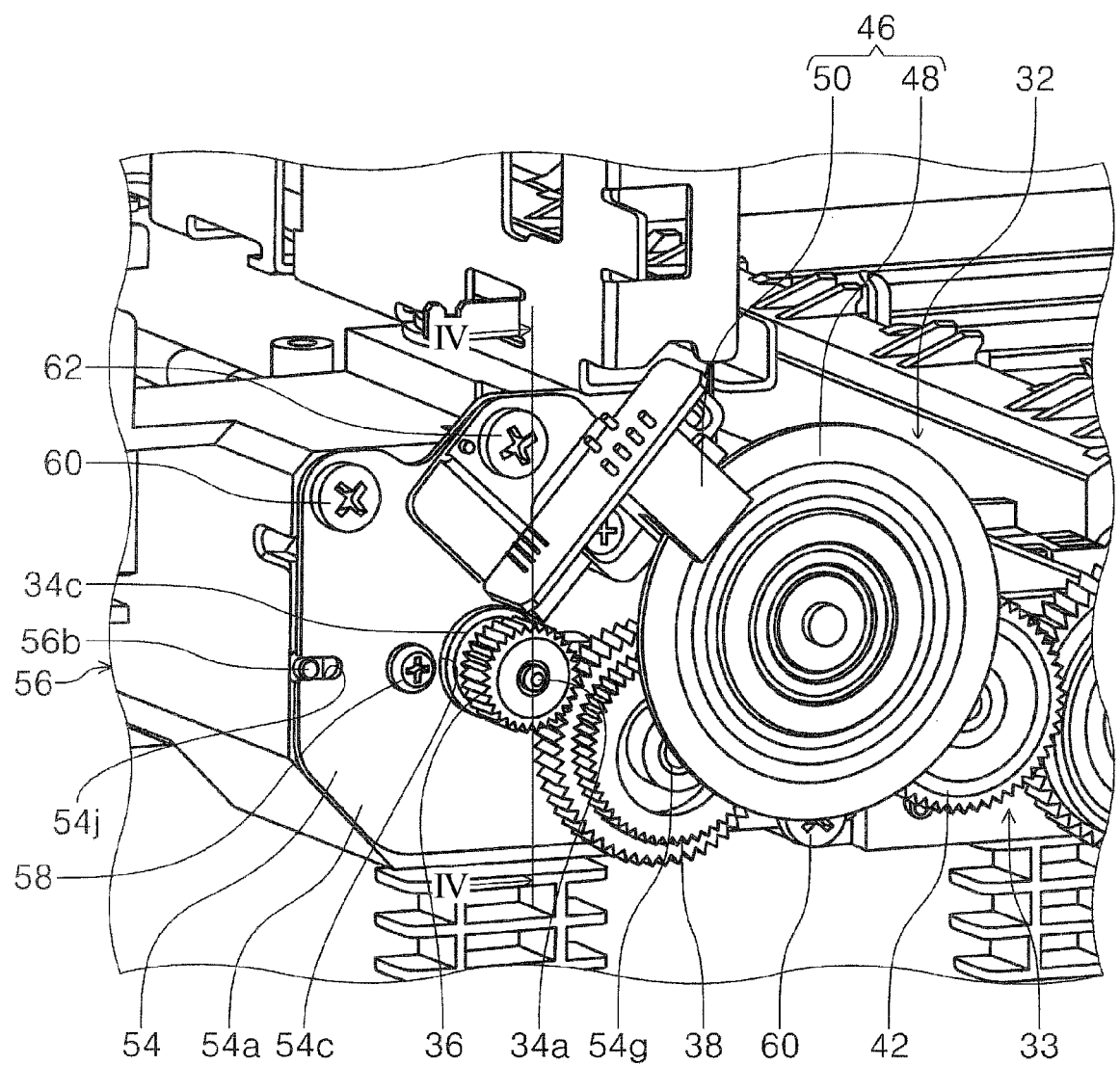
FIG. 3 is a perspective view illustrating a motor mounting frame and a gear train in the apparatus main body.
Figure 4:
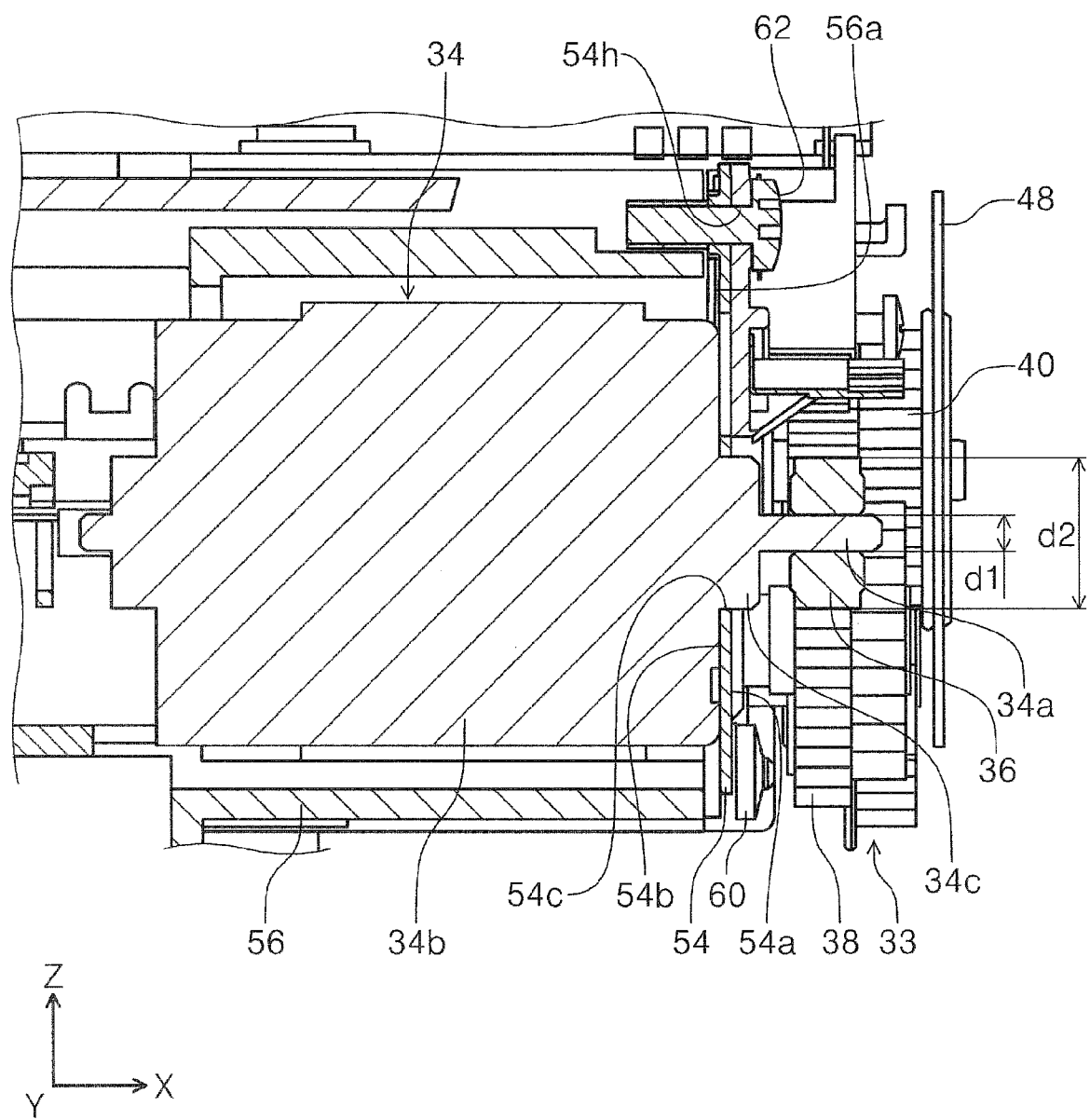
FIG. 4 is a cross-sectional view taken along line IV-IV in FIG. 3.
Figure 6:
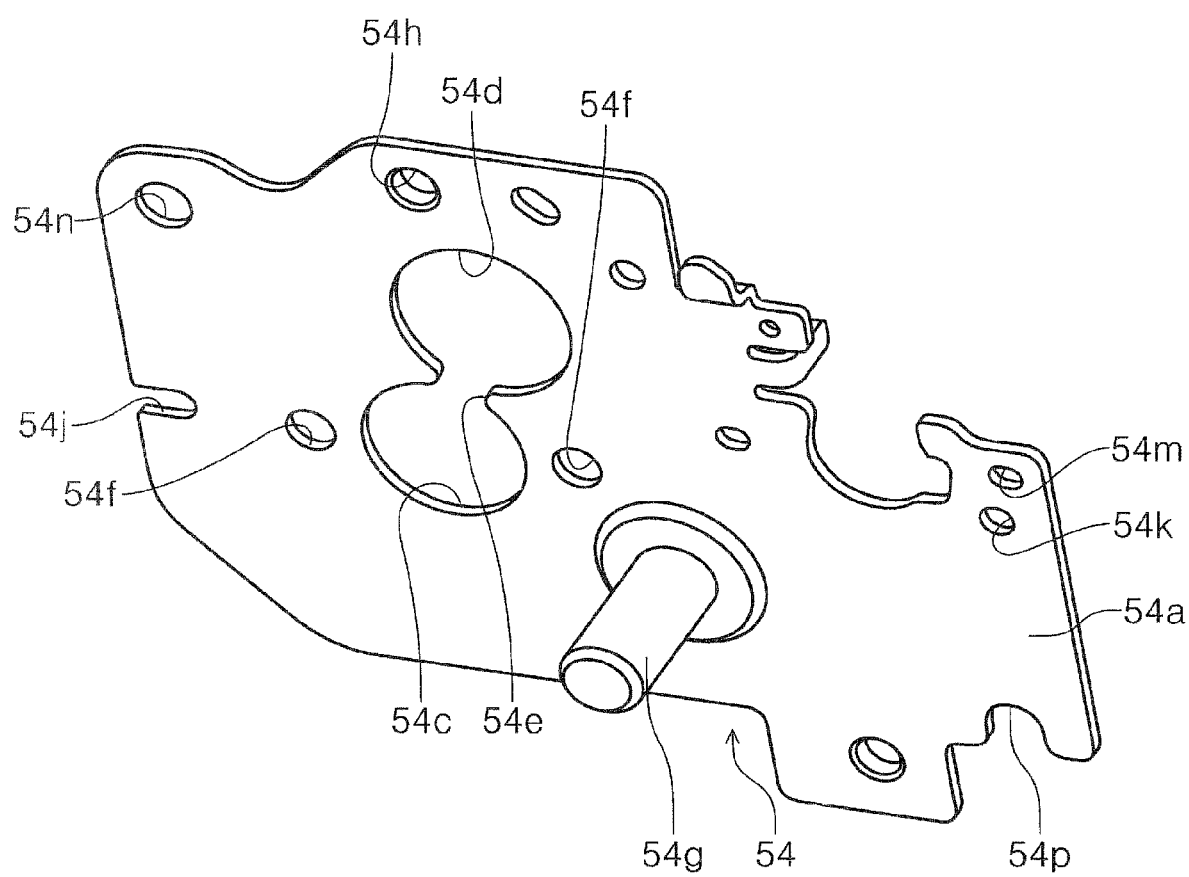
FIG. 6 is a perspective view of the motor mounting frame.
Figure 7:
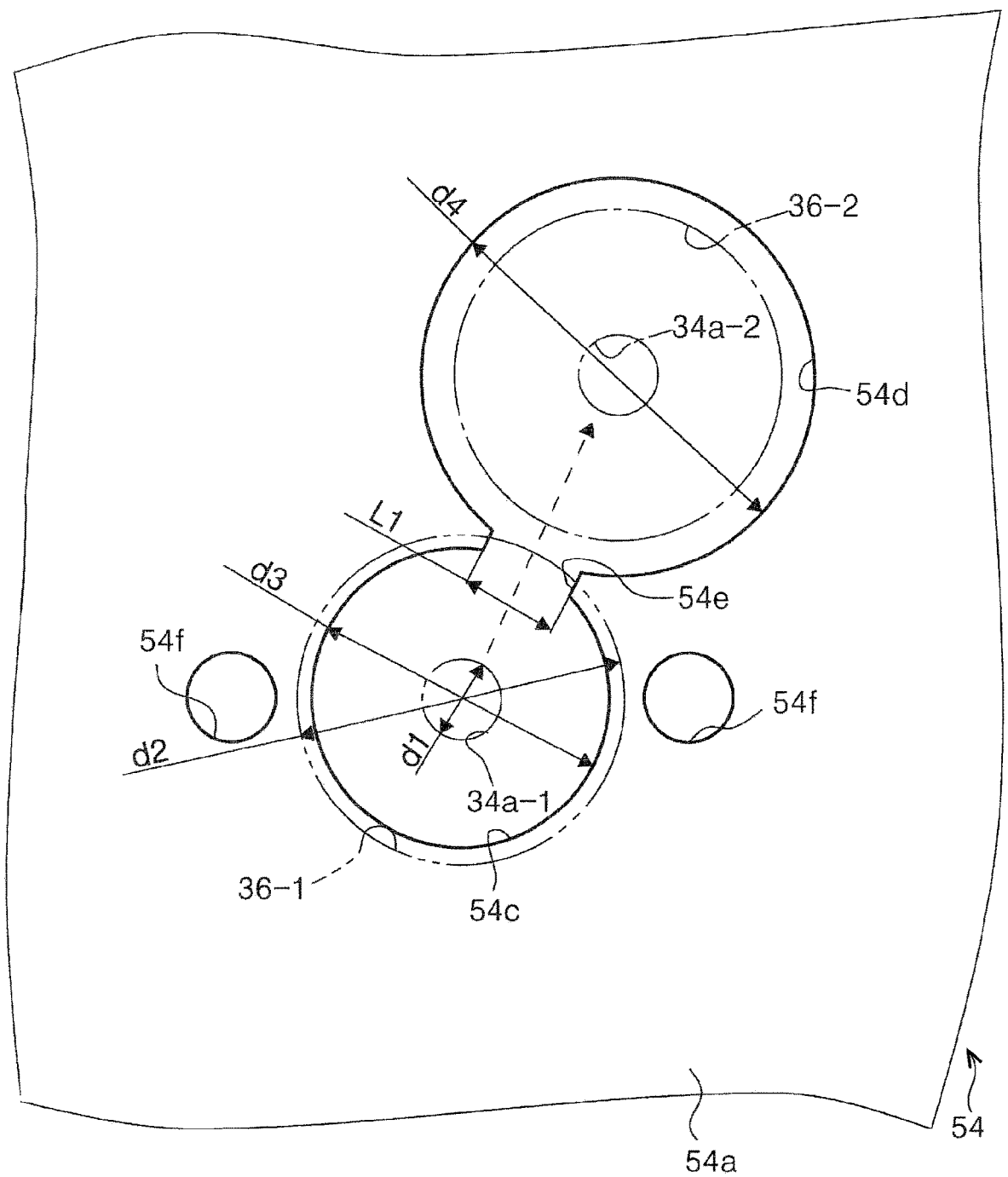
FIG. 7 is a schematic diagram illustrating a relationship between a first hole portion and a second hole portion, and a cylindrical portion and a drive shaft of a motor in the motor mounting frame.

FIG. 1 is an external perspective view of a printer according to an exemplary embodiment of the disclosure, FIG. 2 is a perspective view of an apparatus main body, FIG. 3 is a perspective view illustrating a motor mounting frame and a gear train in the apparatus main body, FIG. 4 is a cross-sectional view taken along line IV-IV in FIG. 3, FIGS. 5A and 5B are front views illustrating states in which fastening members are attached to and removed from the motor mounting frame, FIG. 6 is a perspective view of the motor mounting frame, and FIG. 7 is a schematic diagram illustrating a relationship between a first hole portion and a second hole portion, and a cylindrical portion and a drive shaft of a motor in the motor mounting frame.

Figure 8:
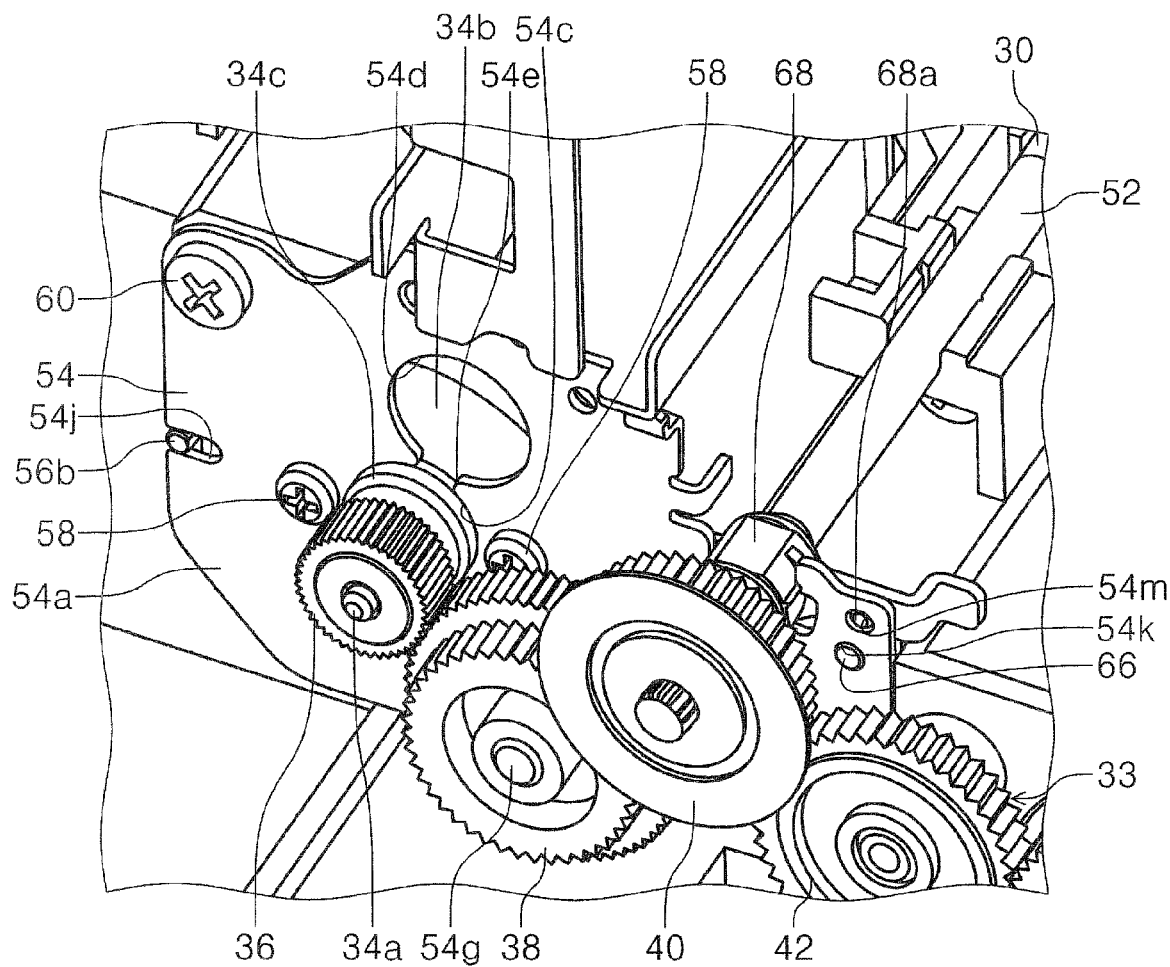
FIG. 8 is a perspective view illustrating a relationship between the motor mounting frame and a restricting portion.
Figure 9:
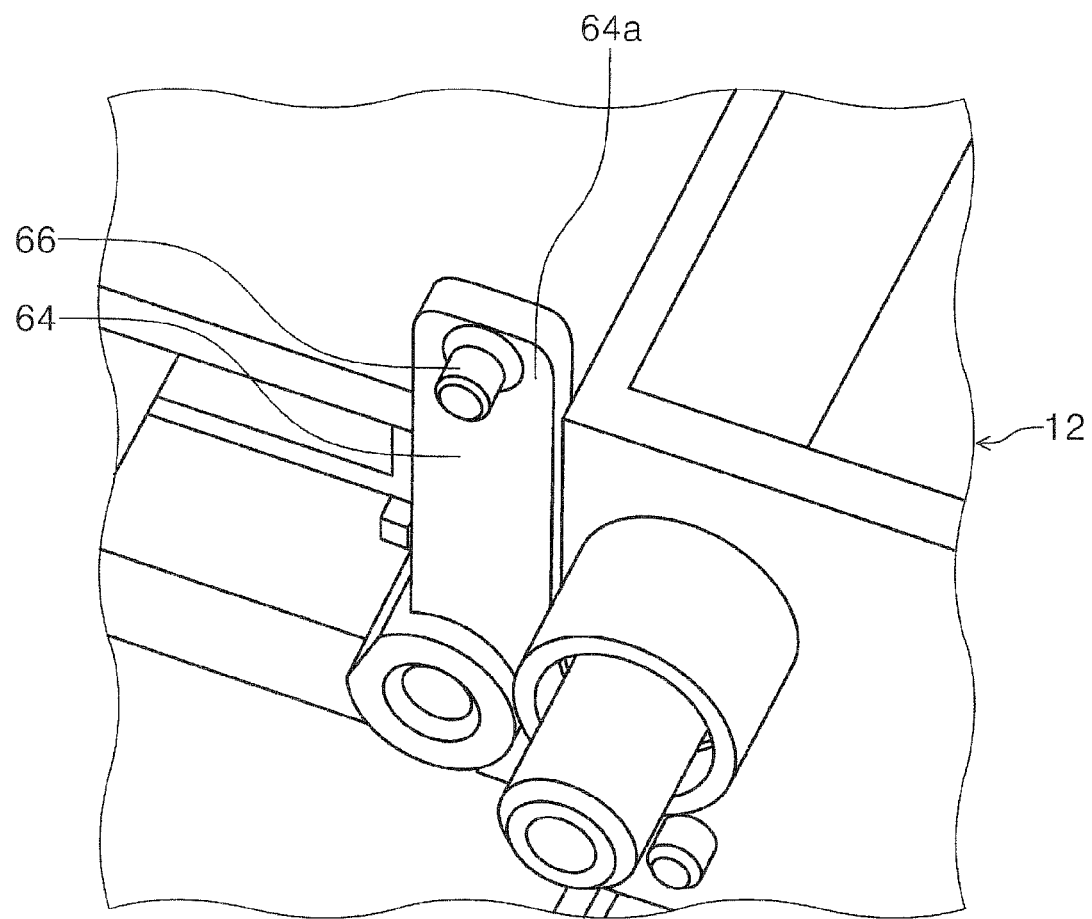
FIG. 9 is a perspective view illustrating the restricting portion.
Figure 10A:
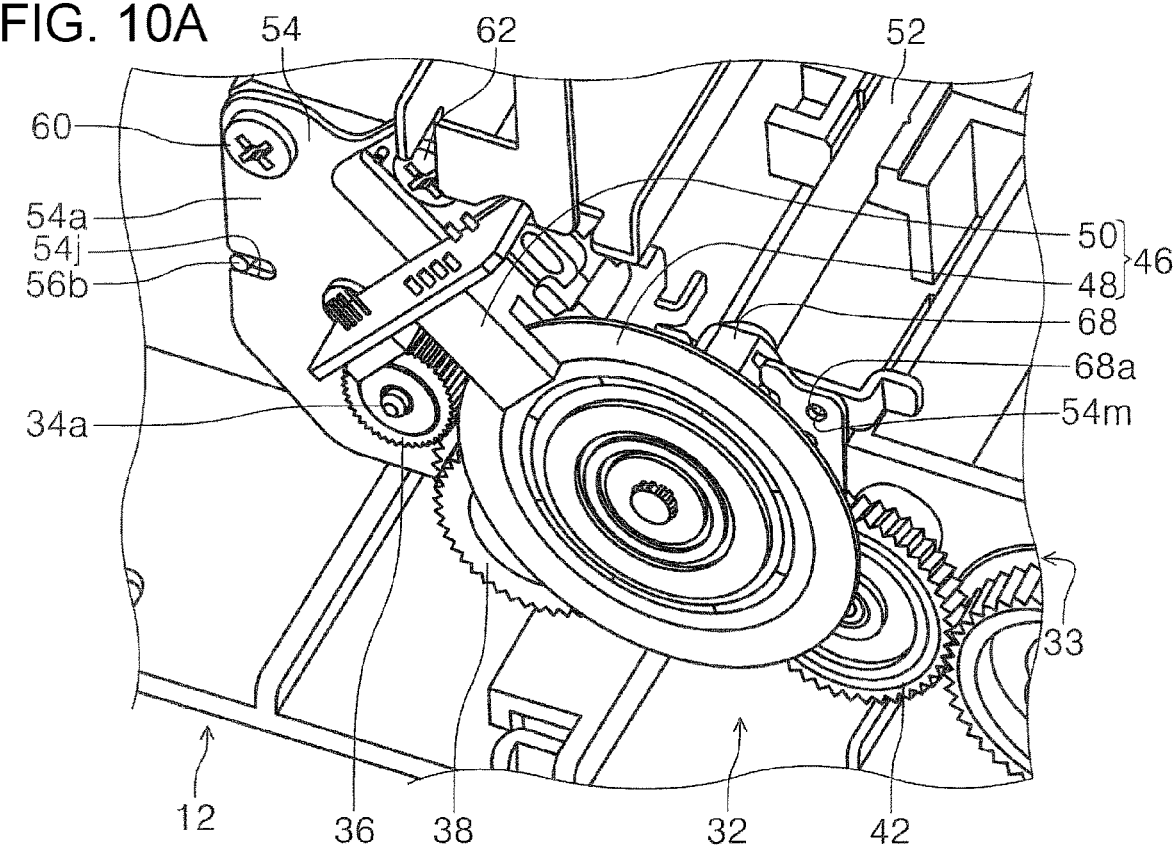
FIGS. 10A and 10B are figures illustrating an attached state of the motor and a first procedure of a motor replacing procedure.
Figure 10B:
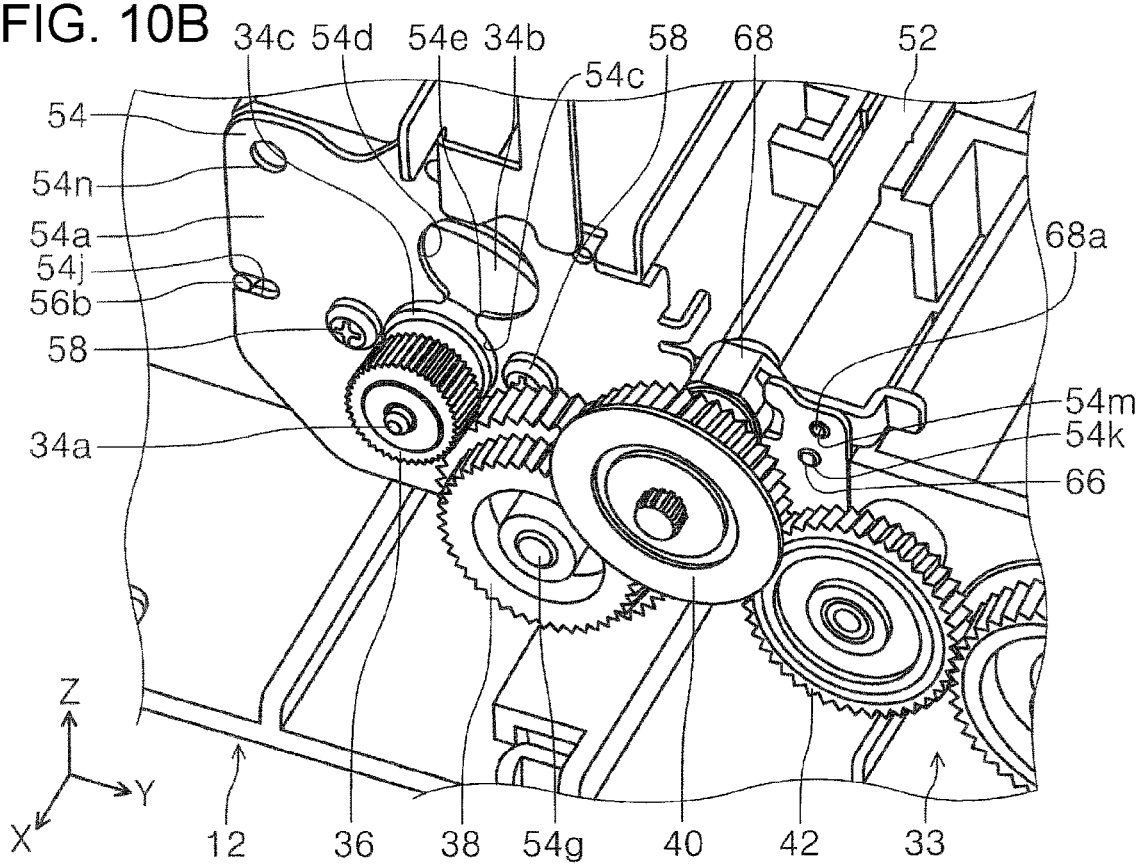
Figure 11A:
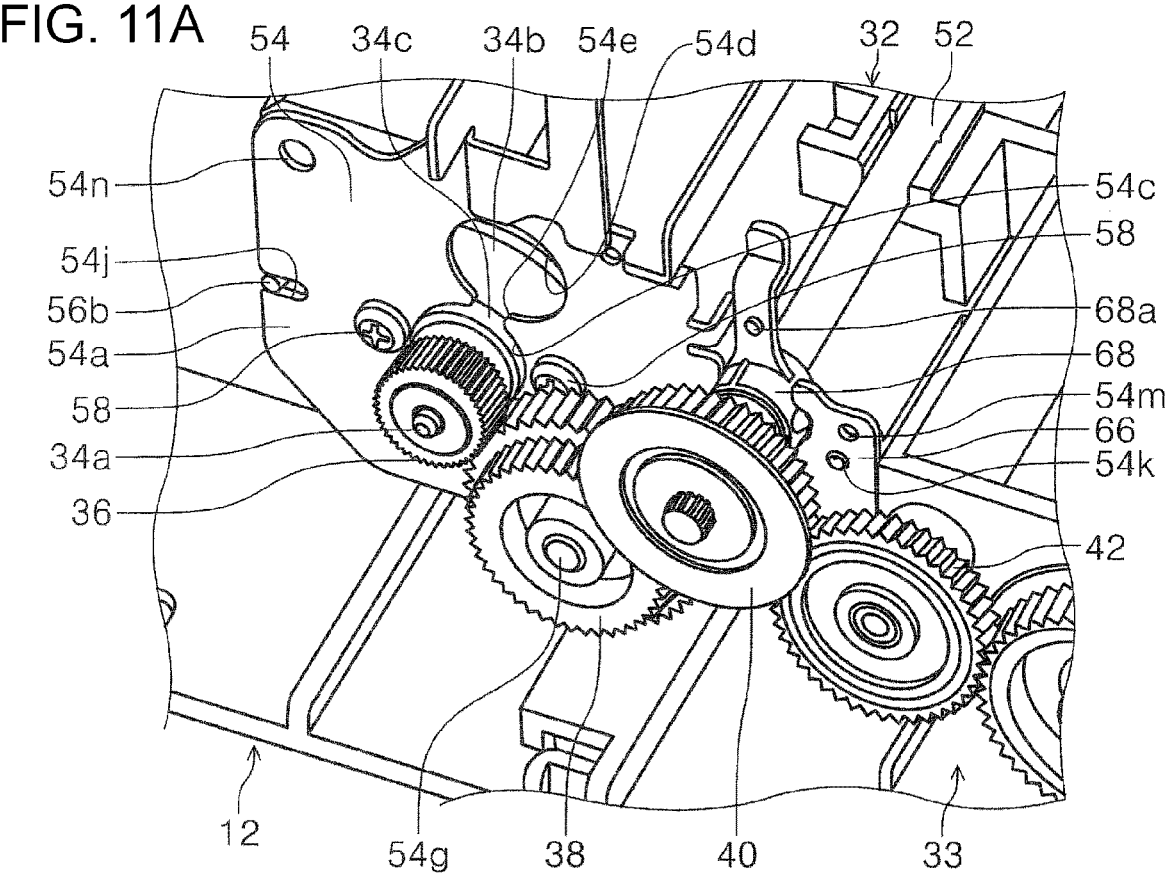
FIGS. 11A and 11B illustrate a second procedure and a third procedure of replacing the motor.
Figure 11B:
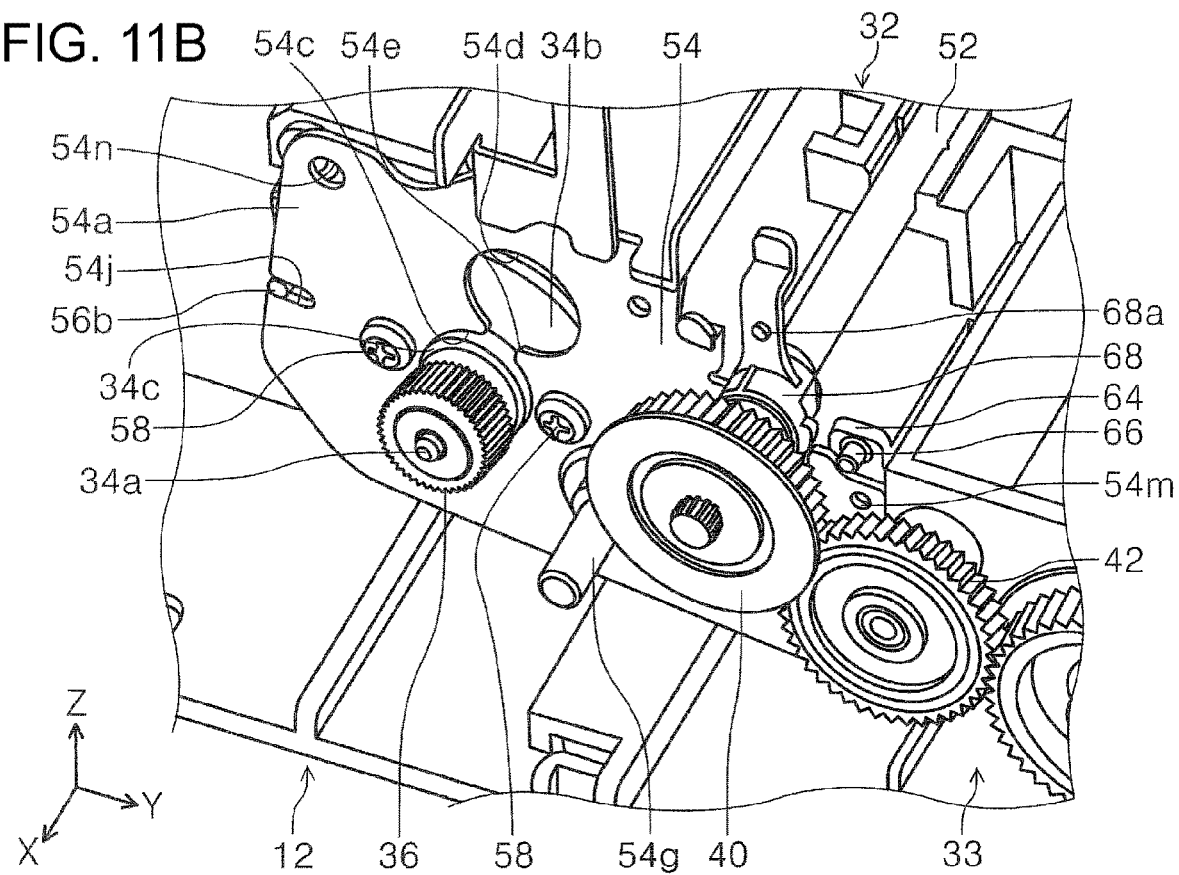
Figure 12A:
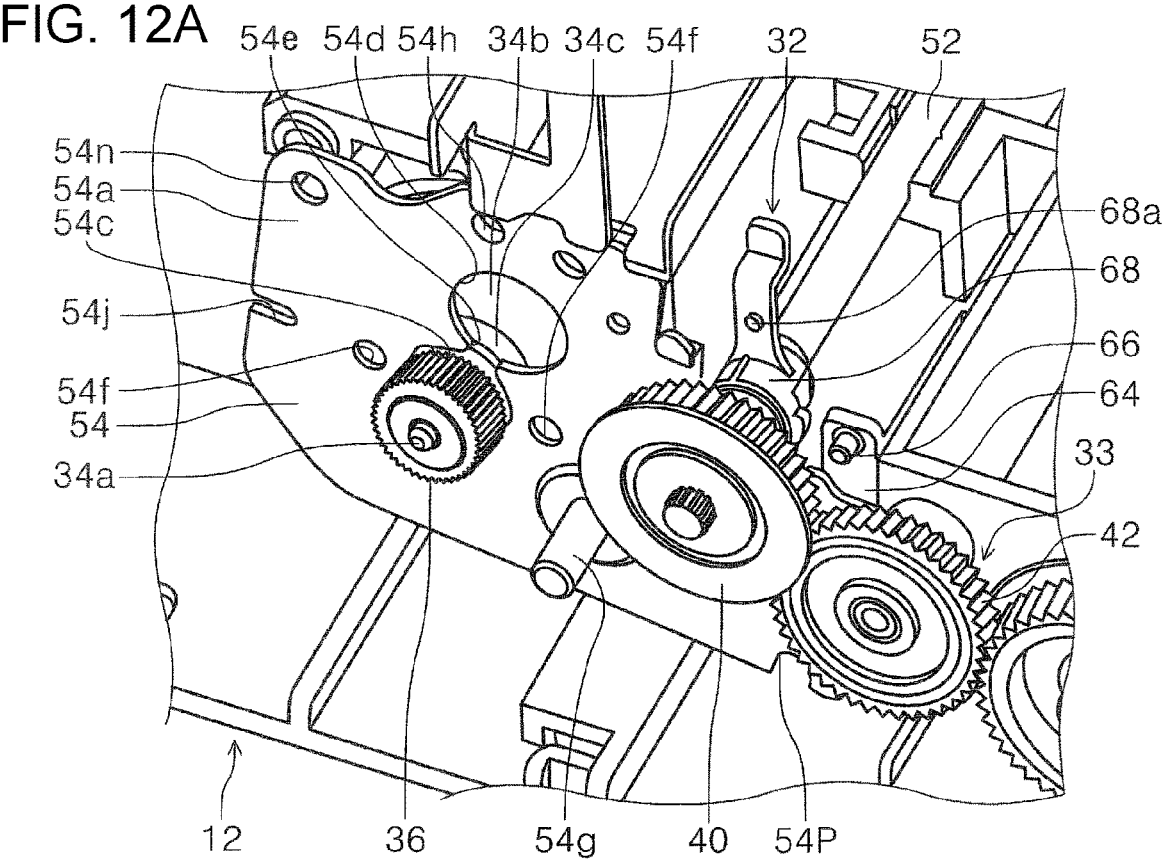
FIGS. 12A and 12B illustrate a fourth procedure and a fifth procedure of replacing the motor.
Figure 12B:
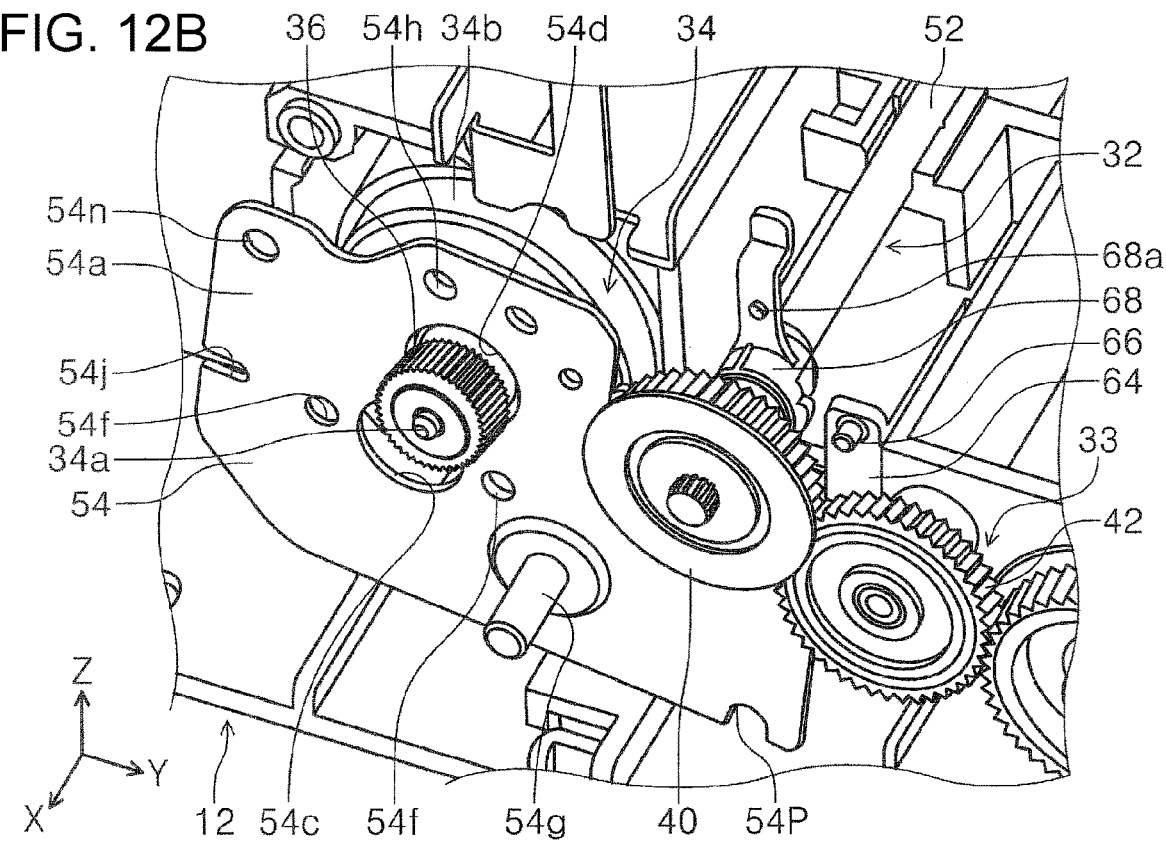
Figure 13:
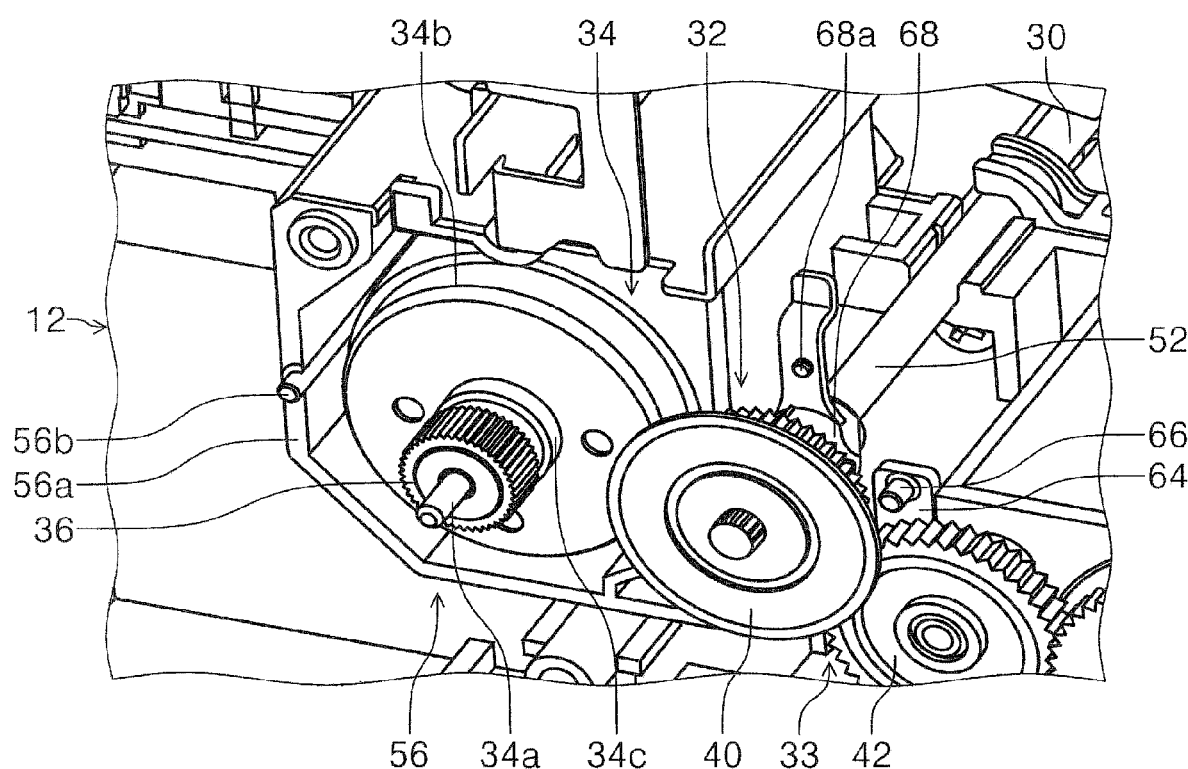
FIG. 13 illustrates a state in which the motor has been exposed during the motor replacing procedure.

FIG. 8 is a perspective view illustrating a relationship between the motor mounting frame and a restricting portion, FIG. 9 is a perspective view illustrating the restricting portion, FIGS. 10A and 10B are figures illustrating an attached state of the motor and a first procedure of a motor replacing procedure, FIGS. 11A and 11B illustrate a second procedure and a third procedure of replacing the motor, FIGS. 12A and 12B illustrate a fourth procedure and a fifth procedure of replacing the motor, and FIG. 13 illustrates a state in which the motor has been exposed during the motor replacing procedure.

Furthermore, in the X-Y-Z coordinate system illustrated in each of the drawings, the X direction indicates the width direction of the recording medium, in other words an apparatus width direction, the Y direction indicates a transport direction of a recording medium in the transport path inside the recording apparatus, in other words, an apparatus depth direction, the +Y direction is an apparatus front side, the −Y direction is an apparatus rear side, and the Z direction indicates an apparatus height direction.

Outline of Printer

Referring to FIG. 1, an overall configuration of a printer 10 according to an exemplary embodiment of the present disclosure will be described. The printer 10 is configured as an ink jet printer serving as an example of the recording apparatus. For example, the printer 10 is a multifunction apparatus including an apparatus main body 12 and a scanner unit 14.

A configuration of the apparatus main body 12 will be described. A control panel 16 pivotable with respect to the apparatus main body 12 is provided on a front side of the apparatus main body 12. A display unit, such as a display panel, and a plurality of operation buttons are provided in the control panel 16. The control panel 16 can be switched between a state (FIG. 1) in which the control panel 16 is closed with respect to the apparatus main body 12, and a state (not shown) in which the control panel 16 is open with respect to the apparatus main body 12.

Moreover, a discharge port 18 is provided on the front side of the apparatus main body 12 and below the control panel 16 in the Z-axis direction. A medium receiving tray 20 is provided in the discharge port 18 so as to extend in a −Z-axis direction. The medium receiving tray 20 can be drawn out towards the front side of the apparatus main body 12. The medium discharged through the discharge port 18 can be stacked on the medium receiving tray 20. A medium accommodation portion 22 is provided below the medium receiving tray 20 in the Z-axis direction. The medium accommodation portion 22 is installed in the apparatus main body 12 from the front side of the apparatus main body 12 so as to be capable of being inserted/removed, and is capable of accommodating the medium therein.

Referring next to FIG. 2, an ink tank storage portion 24 is provided in a portion on the front side of the apparatus main body 12 and in an edge portion of the apparatus main body 12 on the −X-axis direction side. A carriage 26 is provided behind the ink tank storage portion 24. The carriage 26 is capable of reciprocating inside the apparatus main body 12 in the X-axis direction. A recording head 28 (broken line portion in FIG. 2) is provided in a lower portion of the carriage 26. The recording head 28 is capable of ejecting ink downwards.

Referring to FIG. 2, the medium accommodated inside the medium accommodation portion 22 is fed downstream along a medium transport path from the medium accommodation portion 22 with a feed member (not shown). A transport roller 30 is provided downstream of the feed member (not shown) in the medium transport path. The transport roller 30 feeds the medium, which has been fed by the feed member, to an area that opposes the recording head 28. The medium that has been sent to the area opposing the recording head 28 receives ink ejected from the recording head 28 on a surface opposing the recording head 28; accordingly, recording is performed. The medium on which recording has been performed with the recording head 28 passes through the discharge port 18 and is discharged on the medium receiving tray 20.

Exemplary Embodiment

Outline of Roller Driving Member

Referring to FIG. 2, a roller driving member 32 is provided in an end portion of the apparatus main body 12 on the +X-axis direction side. The roller driving member 32 is, for example, a driving force transmission unit that transmits driving force of a motor 34 (FIG. 4) to the transport roller 30 through a plurality of gears. Furthermore, in the exemplary embodiment, the roller driving member 32 transmits the driving force of the motor 34 to a discharge roller (not shown) disposed downstream of the recording head 28 in the medium transport path.

Referring to FIGS. 2, 3, and 8, the roller driving member 32 includes a pinion gear 36 that is attached to a drive shaft 34a of the motor 34, a first transmission gear 38, a transport roller driving gear 40, a second transmission gear 42, a discharge roller driving gear 44, and a detection member 46. The detection member 46, for example, is constituted by an encoder scale 48 and an encoder sensor 50. Note that the pinion gear 36, the first transmission gear 38, the transport roller driving gear 40, the second transmission gear 42, and the discharge roller driving gear 44 constitute a gear set 33.

In the roller driving member 32, the pinion gear 36 and the first transmission gear 38 are engaged with each other, and the first transmission gear 38 and the transport roller driving gear 40 are engaged with each other (FIG. 8). In the above, when a motor 34 is driven, the transport roller driving gear 40 is also rotated through the pinion gear 36 in accordance with the rotation of the drive shaft 34a.

In the exemplary embodiment, the pinion gear 36 is impregnated with a lubricant. For example, the pinion gear 36 can be formed by, after forming a sintered compact by compacting and sintering metal powder, impregnating the sintered compact with machine oil. The lubricant in the exemplary embodiment contains, for example, lubricating oil and grease with low viscosity. With the above, generation of abrasion powder is reduced or suppressed while the pinion gear 36 and the first transmission gear 38 are engaged with each other. Specifically, the lubricant, for example, lubricating oil with which the pinion gear 36 is impregnated, oozes out to the engagement between the pinion gear 36 and the first transmission gear 38 and forms a lubricant film; accordingly, the sliding friction between the pinion gear 36 and the first transmission gear 38 is reduced. With the above, generation of abrasion powder in the engagement between the pinion gear 36 and the first transmission gear 38 is suppressed or reduced. Note that by setting the oil content (according to JIS Z 2501) in the lubricant to at least 10%, the above effect can be increased even more.

The transport roller driving gear 40 is attached to an end portion of a shaft 52 of the transport roller 30 on the +X-axis direction side (hereinafter, the +X-axis direction side is referred to as a front side, and the −X-axis direction side is referred to as a rear side). When the transport roller driving gear 40 rotates, the transport roller 30 also rotates through the shaft 52. Moreover, the encoder scale 48 (FIG. 3) having a disk shape is adhered in a detachable manner with an adhesive member or the like to a front end portion of the transport roller driving gear 40. The encoder sensor 50 is disposed so as to be capable of reading the encoder scale 48. Note that the encoder scale 48 is disposed on the frontmost side with respect to the gear set 33 in FIG. 3 (in a state in which the motor 34 is mounted).

Referring to FIG. 8, the transport roller driving gear 40 is engaged with the second transmission gear 42. The second transmission gear 42 in the gear set 33 is disposed so as to transmit the motive force to the discharge roller driving gear 44 through a plurality of transmission gears. Accordingly, when the motor 34 is driven, the discharge roller driving gear 44 is rotationally driven as well.

Similar to the transport roller driving gear 40, the discharge roller driving gear 44 is attached to a front end portion of a shaft of the discharge roller, and with the rotation of the discharge roller driving gear 44, the discharge roller also rotates in the same direction as the rotation direction of the discharge roller driving gear 44.

Mounting Structure of Motor

Referring to FIG. 4, the motor 34 includes a main body portion 34b, the drive shaft 34a that projects from the main body portion 34b in the +X-axis direction, and a cylindrical portion 34c provided around the drive shaft 34a. Referring to FIGS. 4 and 13, an outside diameter of the cylindrical portion 34c is set smaller than an outside diameter of the main body portion 34b. Note that in the exemplary embodiment, the outside diameter of the drive shaft 34a is set to d1, and the outside diameter of the pinion gear 36 is set to d2 (FIG. 4).

Referring to FIGS. 3 and 4, the motor 34 is mounted on a motor mounting frame 54. In the motor mounting frame 54, a surface on the front side (on the +X-axis direction side) is a first frame surface 54a, and a surface on the rear side (−X-axis direction side) is a second frame surface 54b. Referring to FIG. 4, the motor 34 is mounted on the motor mounting frame 54 with a plurality of fastening members 58 (FIG. 8) so that the drive shaft 34a of the motor 34 protrudes towards the front side with respect to the first frame surface 54a, and so that the main body portion 34b opposes the second frame surface 54b. Note that while the fastening members 58 in the exemplary embodiment are, as an example, screws, the fastening members 58 may be bolts or the like.

Referring to FIGS. 3, 4, and 13, a motor accommodation portion 56 is provided in an end portion of the apparatus main body 12 on the +X-axis direction side. For example, the motor accommodation portion 56 is formed as a recessed portion (FIG. 13) open on the front side (on the +X-axis direction side). At least a portion of the motor 34, specifically, the main body portion 34b of the motor 34, is accommodated in the motor accommodation portion 56. A front end portion of the motor accommodation portion 56 is formed as a frame attaching portion 56a.

Referring to FIGS. 3 and 4, the motor mounting frame 54 is attached and fixed to the frame attaching portion 56a with a plurality of fastening members 60 (FIGS. 3 and 5A) so that the second frame surface 54b of the motor mounting frame 54 and the frame attaching portion 56a oppose each other. As an example, in the exemplary embodiment, two fastening members 60 fix the motor mounting frame 54 to the frame attaching portion 56a. Note that while the fastening members 60 in the exemplary embodiment are, as an example, screws, the fastening members 60 may be bolts or the like.

As illustrated in FIG. 5A, in a state (hereinafter, referred to as an attached state) in which the motor mounting frame 54 is attached to the frame attaching portion 56a, at least a portion of each fastening member 60 is exposed when the first frame surface 54a is viewed from the front side. Specifically, the positions where the fastening members 60 are fitted are outside an area in the motor mounting frame 54 where the pinion gear 36, the first transmission gear 38, the transport roller driving gear 40, the second transmission gear 42, and the encoder scale 48 are provided.

Accordingly, the fastening members 60 can be accessed easily from the front side of the motor mounting frame 54. As a result, as illustrated in FIG. 5B, the fastening members 60 can be removed from the motor mounting frame 54 without dismounting the pinion gear 36, the first transmission gear 38, the transport roller driving gear 40, the second transmission gear 42, and the encoder scale 48.

Referring to FIG. 6, the motor mounting frame 54 is formed as a flat plate member. For example, the motor mounting frame 54 is formed by performing processing, such as pressing, on a metal material. A plurality of through holes are provided in the motor mounting frame 54. Specifically, a first hole portion 54c and a second hole portion 54d are provided at the center portion of the motor mounting frame 54. A cut-out portion 54e is provided between the first hole portion 54c and the second hole portion 54d. The cut-out portion 54e connects the first hole portion 54c and the second hole portion 54d to each other. Mounting holes 54f for mounting the fastening members 58 are each provided on both sides of the first hole portion 54c in the Y-axis direction.

Referring to FIG. 7, the diameter of the first hole portion 54c is set to d3. The diameter d3 is set larger than the outside diameter d1 of the drive shaft 34a of the motor 34, and smaller than the outside diameter d2 of the pinion gear 36. The diameter of the second hole portion 54d is set to d4. The diameter d4 is set larger than the outside diameter d1 of the drive shaft 34a of the motor 34 and the outside diameter d2 of the pinion gear 36. The width of the cut-out portion 54e is set to L1. The width L1 is set larger than the outside diameter d1 of the drive shaft 34a of the motor 34.

Referring to FIG. 7, note that the circles that are depicted by two-dot chain lines and that are attached with reference numerals 34a-1 and 36-1 illustrate the positions of the drive shaft 34a and the pinion gear 36 in the attached state, respectively, and the circles that are depicted by dot and dash lines and that are attached with reference numerals 34a-2 and 36-2 illustrate a state in which the drive shaft 34a and the pinion gear 36 are positioned inside the second hole portion 54d. Dismounting and mounting of the motor 34 with respect to the motor mounting frame 54 will be described later.

In the motor mounting frame 54, a shaft 54g projects towards the front side. The first transmission gear 38 is rotatably attached to the shaft 54g. Moreover, a through hole 54h is provided above the second hole portion 54d. Referring to FIGS. 3 and 4, the encoder sensor 50 is mounted on the motor mounting frame 54 by passing a fastening member 62 through the through hole 54h and fastening the fastening member 62 to the apparatus main body 12. Note that while the fastening member 62 in the exemplary embodiment is, as an example, a screw, the fastening member 62 may be a bolt or the like.

Moreover, a first restricted portion 54j is provided at an edge portion of the motor mounting frame 54 in the −Y-axis direction side, and a second restricted portion 54k is provided on the other side, that is, on the +Y-axis direction side. For example, the first restricted portion 54j is formed in a slit shape that extends in the Y-axis direction. For example, the second restricted portion 54k is formed as a through hole. Moreover, a bush positioning portion 54m having a shape of a through hole is provided above the second restricted portion 54k in the Z-axis direction. Description of the bush positioning portion 54m will be given later.

Referring to FIGS. 8 and 13, a pin-shaped first restricting portion 56b projects to the front side at an end portion of the frame attaching portion 56a on the −Y-axis direction side. In the attached state, the first restricting portion 56b is fitted to the first restricted portion 54j so as to restrict the displacement of the motor mounting frame 54 with respect to the frame attaching portion 56a in the Z-axis direction.

Referring to FIG. 6, the motor mounting frame 54 is further provided with fastening member attaching portions 54n and 54p. As illustrated in FIG. 5A, the fastening members 60 are passed through the fastening member attaching portions 54n and 54p so that the motor mounting frame 54 is attached to the frame attaching portion 56a.

Referring to FIG. 9, a flat plate-shaped deformation portion 64 that projects upwards in the Z-axis direction is provided in the apparatus main body 12. A second restricting portion 66 serving as a "restricting portion" is formed at an upper end portion 64a of the deformation portion 64 in the Z-axis direction. The second restricting portion 66 is formed as a pin that projects to the front side at an upper end portion 64a of the deformation portion 64. The deformation portion 64 is capable of being elastically deformed in the X-axis direction. For example, when force pushing the second restricting portion 66 towards the rear side acts on the second restricting portion 66, the upper end portion 64a of the deformation portion 64 is also deformed towards the rear side, and when the force pushing the second restricting portion 66 acts on the second restricting portion 66 no more, the upper end portion 64a of the deformation portion 64 returns to the original position.

Referring to FIG. 8, in the attached state, the second restricting portion 66 fits into the second restricted portion 54k of the motor mounting frame 54. In the above state, the second restricting portion 66 restricts the displacement of the motor mounting frame 54 with respect to the frame attaching portion 56a.

Referring to FIG. 8, a roller bush 68 is provided at an end portion of the shaft 52 of the transport roller 30 on the front side (+X-axis side) and on the rear side (−X-axis side) of the transport roller driving gear 40. A positioning pin 68a is provided in the roller bush 68. By having the positioning pin 68a fit in the bush positioning portion 54m, the position of the roller bush 68 in the Z-axis direction is restricted. As a result, the position of the shaft 52 in the Z-axis direction is restricted.

Motor Replacing Procedure

Referring to FIGS. 10A to 13, a procedure of replacing the motor 34 will be described next. FIG. 10A illustrates the motor 34 in the apparatus main body 12 in the attached state. As a first procedure (FIG. 10B) in the procedure of replacing the motor 34, the fastening members 60 are removed from the motor mounting frame 54. The fastening member 62 is removed next, and the encoder sensor 50 is dismounted. Subsequently, the encoder scale 48 is dismounted from the transport roller driving gear 40.

Subsequently, as a second procedure (FIG. 11A), the positioning pin 68a of the roller bush 68 is removed from the bush positioning portion 54m, the roller bush 68 is turned, and the positioning pin 68a is retreated above the motor mounting frame 54.

Next, as a third procedure (FIG. 11B), the first transmission gear 38 is dismounted from the shaft 54g. Subsequently, the second restricting portion 66 is pressed towards the rear side to elastically deform the deformation portion 64 towards the rear side. With the above, the second restricting portion 66 moves out of the second restricted portion 54k, and the fitted state between the second restricting portion 66 and the second restricted portion 54k is cancelled.

Next, as a fourth procedure (FIG. 12A), the fastening members 58 are removed from the motor mounting frame 54. With the above, the motor mounting frame 54 can be displaced to a position in front of the motor 34, specifically, the motor mounting frame 54 can be displaced to a position where the cylindrical portion 34c has been moved out of the first hole portion 54c. When the motor mounting frame 54 is displaced towards the front side, the cylindrical portion 34c moves out of the first hole portion 54c, and the fitted state between the first restricting portion 56b and the first restricted portion 54j is cancelled. In the above state, the motor mounting frame 54 can be slid and moved in a direction parallel to the second frame surface 54b (FIG. 4) while at least a portion of the motor mounting frame 54 is in contact with the frame attaching portion 56a.

Next, as a fifth procedure (FIG. 12B), the motor mounting frame 54 is slid and moved with respect to the frame attaching portion 56a in a direction parallel to the second frame surface 54b (FIG. 4). In the exemplary embodiment, the motor mounting frame 54 is slid and moved downwards. With the above, the drive shaft 34a of the motor 34 passes through the cut-out portion 54e from the first hole portion 54c and is displaced to the second hole portion 54d.

Referring to FIG. 7, the relationship between the drive shaft 34a of the motor, and the first hole portion 54c and the second hole portion 54d will be described next. In a state in which the motor 34 is mounted on the motor mounting frame 54 (FIG. 3), the cylindrical portion 34c is fitted in the first hole portion 54c. In such a state, even if one attempts to separate the motor mounting frame 54 from the motor 34 towards the front side, as illustrated in FIG. 7, since the outside diameter d2 of the pinion gear 36 is larger than the diameter d3 of the first hole portion 54c, the first hole portion 54c is caught by the pinion gear 36 and the motor mounting frame 54 cannot be dismounted from the motor 34.

When the motor mounting frame 54 becomes slidable and movable with respect to the frame attaching portion 56a in the fourth procedure, the drive shaft 34a can be transferred from a state in which the drive shaft 34a is inside the first hole portion 54c (the state depicted by reference numeral 34a-1) to a state in which the drive shaft 34a having moved through the cut-out portion 54e is inside the second hole portion 54d (the state depicted by reference numeral 34a-2). Referring to FIG. 12B, in the above, since the diameter d4 of the second hole portion 54d is larger than the outside diameter d2 of the pinion gear 36, the motor mounting frame 54 can be pulled out towards the front side with respect to the motor 34 and the pinion gear 36.

As a result, as illustrated in FIG. 13, since the motor mounting frame 54 can be detached from the frame attaching portion 56a, the main body portion 34b of the motor 34 accommodated in the motor accommodation portion 56 can be exposed. Accordingly, access to the motor 34 is allowed. Moreover, in the exemplary embodiment, since the motor 34 is mounted in the apparatus main body 12 with the motor mounting frame 54 in between, the motor 34 can be readily drawn out from the motor accommodation portion 56 to the front side, and repair or replacement thereof can be performed. Note that the motor 34 can be mounted by performing the first procedure to the fifth procedure in an opposite manner.

Modifications of Exemplary Embodiment (1) In the exemplary embodiment, the motor 34 is configured as the driving motor of the roller driving member 32 that drives the transport roller 30 and the discharge roller; however, alternative to the above, for example, the configuration of the motor 34 and the motor mounting frame 54 may be applied to a motor that drives the carriage 26, a motor that drives the feed member that feeds the medium from the medium accommodation portion 22, or a motor that drives the feed member that feeds the medium in the scanner unit 14, for example.

(2) In the exemplary embodiment, the pinion gear 36 is, as an example, a flat gear illustrated in FIG. 3; however, alternative to the above, the pinion gear 36 may be a spiral gear such as, for example, a helical gear. By having a spiral gear, the noise generated when the gear is rotated can be reduced.

The above description will be summarized. The printer 10 includes the motor 34, the motor mounting frame 54 that is a frame on which the motor 34 is attached, in which the drive shaft 34a of the motor 34 is projected towards the front side (on the +X-axis direction side) with respect to the first frame surface 54a that is on the front side in the attached state, and in which the motor 34 is attached thereon while having the second frame surface 54b that is on the rear side (−X-axis direction side) and the main body portion 34b of the motor 34 oppose each other in the attached state, and the frame attaching portion 56a on which the motor mounting frame 54 is attached while being opposed to the second frame surface 54b of the motor mounting frame 54. In the attached state, when viewing the first frame surface 54a from the front, at least a portion of each fastening member 60 that fixes the motor mounting frame 54 to the frame attaching portion 56a is exposed and is at an attachable and detachable position.

According to the configuration described above, the motor 34 is provided on the frame attaching portion 56a with the motor mounting frame 54 in between, and at least a portion of each fastening member 60 that fixes the motor mounting frame 54 to the frame attaching portion 56a is exposed when, in the attached state, the first frame surface 54a is viewed from the front and each fastening member 60 is at an attachable and detachable position. Even in a state in which the degree of freedom of dismounting the components around the motor 34 is low, the fixed state of the motor mounting frame 54 with respect to the frame attaching portion 56a can at least be cancelled; consequently, work efficiency when replacing the motor 34 is improved.

The printer 10 includes the gear set 33 that rotates by receiving motive force from the motor 34, and the encoder scale 48 that is attached to at least one of the gears included in the gear set 33 and that constitutes the detection member 46 that detects the rotation. In the attached state, when the first frame surface 54a is viewed from the front side, the fastening members 60 are positioned outside the gear set 33 and the encoder scale 48. According to the above configuration, the attaching and removing of the fastening members 60 can be performed more readily.

The main body portion 34b of the motor 34 includes, around the drive shaft 34a, the cylindrical portion 34c that has a diameter that is smaller than the outside diameter of the main body portion 34b. In the attached state, the pinion gear 36 is attached to the drive shaft 34a of the motor 34. The motor mounting frame 54 includes the first hole portion 54c to which the cylindrical portion 34c is fitted when in the attached state. In the first hole portion 54c, the drive shaft 34a of the motor 34 is projected towards the front side with respect to the first frame surface 54a when in the attached state. The first hole portion 54c has a diameter that is smaller than the outside diameter d2 of the pinion gear 36. The motor mounting frame 54 includes the second hole portion 54d that has a diameter that is larger than the outside diameter d2 of the pinion gear 36, and the cut-out portion 54e that connects the first hole portion 54c and the second hole portion 54d to each other and that has a width L1 that is larger than the outside diameter d1 of the drive shaft 34a of the motor 34.

According to the above configuration, even in a case in which the pinion gear 36 is provided on the drive shaft 34a of the motor 34 in a fixed manner (in a not easily dismounted manner), by using the second hole portion 54d while the pinion gear 36 is attached to the drive shaft 34a of the motor 34, the drive shaft 34a of the motor 34 can be passed through to the first hole portion 54c that is a fixing position thereof with respect to the motor mounting frame 54; accordingly, mounting and dismounting work of the motor 34 is facilitated.

The pinion gear 36 is impregnated with a lubricant. According to the above configuration, since the pinion gear 36 is impregnated with a lubricant, for example, sliding friction in the engagement between the pinion gear 36 and the first transmission gear 38 engaged with the pinion gear 36 can be reduced, and generation of abrasion powder between the pinion gear 36 and the first transmission gear 38 engaged with the pinion gear 36 can be suppressed. Note that by setting the oil content (according to JIS Z 2501) in the lubricant to at least 10%, the above effect can be increased even more.

The motor mounting frame 54 is slidable in a direction parallel to the second frame surface 54b while the second frame surface 54b is in contact with the frame attaching portion 56a, and the motor mounting frame 54 can become detached from the frame attaching portion 56a by being slid. According to the above configuration, the motor mounting frame 54 can be dismounted readily and the replacement operation of the motor 34 is facilitated.

The frame attaching portion 56a includes the second restricting portion 66 that restricts the position of the motor mounting frame 54 in a direction parallel to the second frame surface 54b. The second restricting portion 66 is provided on a deformation portion 64 that is capable of elastic deformation in the X-axis direction that is a direction that intersects the second frame surface 54b. According to the above configuration, the restriction of the position of the motor mounting frame 54 restricted with the second restricting portion 66 can be canceled with a simple operation, and the motor mounting frame 54 can be dismounted in a further readily manner.

In the printer 10, the encoder scale 48 is provided at a position on the frontmost side with respect to the gear set 33 when in the attached state. According to the above configuration, one can expect the encoder scale 48 that is easily broken to be easily dismounted first, and the encoder scale 48 to be prevented from being broken when dismounting the motor 34.

Furthermore, in the exemplary embodiment, the motor 34, the motor mounting frame 54, and the frame attaching portion 56a according to the disclosure are applied to an ink jet printer that is an example of the recording apparatus; however, the motor 34, the motor mounting frame 54, and the frame attaching portion 56a can be applied to any other general liquid ejection apparatus.

Herein, the liquid ejection apparatus is not limited to a recording apparatus such as a printer, a copying machine, or a facsimile machine that performs recording on a recording medium by using an ink jet recording head to eject ink from the recording head, but also includes an apparatus that ejects liquid, which meets the purpose of the apparatus and is provided in place of the ink, onto a medium to be ejected, which corresponds to the recording medium, from a liquid ejection head, which corresponds to the ink jet recording head, to deposit the liquid onto the medium to be ejected.

Other than the recording head described above, the liquid ejection head may include, for example, a color material ejection head that is used to manufacture color filters for liquid crystal displays and the like, an electrode material (conductive paste) ejection head that is used to form electrodes for organic EL displays, surface emitting displays (FED), and the like, a bio organic matter ejecting head used to manufacture biochips, and a sample ejection head serving as a precision pipette.

Note that the disclosure is not limited to the exemplary embodiment described above and may be modified in various ways that is within the scope of the claims. It goes without saying that the modifications are also included in the scope of the disclosure.

The entire disclosure of Japanese Patent Application Nos. 2017-047041, filed Mar. 13, 2017, and 2017-160890, filed Aug. 24, 2017, are expressly incorporated by reference herein.

What is claimed is:
1. A recording apparatus comprising:
a motor having a main body portion and a drive shaft;
a motor accommodation portion disposed at an end portion of the recording apparatus and having a recessed portion that accommodates the main body of the motor, the motor accommodation portion including a frame attaching portion formed at a front end of the motor accommodation portion; and
a motor mounting frame having a first frame surface and a second frame surface, the motor mounting frame being removably attached to the frame attaching portion by a fastening member,
wherein:
when the second frame surface of the motor mounting frame is removed from the frame attaching portion, the motor is in a detached state, such that the motor is removable from the motor accommodation portion,
when the second frame surface of the motor mounting frame is attached to the frame attaching portion by the fastening member, the motor is in an attached state, such that the main body of the motor is contained in the recessed portion of the motor accommodation portion and not removable from the motor accommodation portion, when the motor is in the attached state,
the first frame surface faces a front side,
the second frame surface faces a rear side,
the drive shaft of the motor projects towards the front side,
the second frame surface and the main body portion oppose against each other,
the motor mounting frame covers the motor accommodation portion, and
at least a portion of the fastening member is exposed to a user when viewing the first frame surface from the front side, such that the fastening member can be attached or detached by the user.

2. The recording apparatus according to claim 1, further comprising:
a gear set that rotates by receiving motive force from the motor, the gear set comprising at least one gear;
an encoder scale attached to the at least one gear included in the gear set, the encoder scale configured to detect rotation of the at least one gear,
wherein in the attached state, the fastening member is positioned outside the gear set and the encoder scale when viewing the first frame surface from the front side.

3. The recording apparatus according to claim 2,
wherein in the attached state, the encoder scale is provided on a front side of the at least one gear of the gear set.

4. The recording apparatus according to claim 1,
wherein the motor has a cylindrical portion that has a diameter that is smaller than an outside diameter of the main body portion,
wherein in the attached state, a pinion gear is attached to the drive shaft of the motor, and
wherein the motor mounting frame includes
a first hole portion in which, in the attached state, the cylindrical portion fits and through which the drive shaft of the motor is projected towards the front side with respect to the first frame surface, the first hole portion having a diameter that is smaller than an outside diameter of the pinion gear,
a second hole portion that has a diameter that is larger than the outside diameter of the pinion gear, and
a cut-out portion that connects the first hole portion and the second hole portion to each other, the cut-out portion having a width that is larger than an outside diameter of the drive shaft of the motor.

5. The recording apparatus according to claim 4,
wherein the pinion gear is impregnated with a lubricant.

6. The recording apparatus according to claim 1,
wherein the motor mounting frame is slidable in a direction parallel to the second frame surface when the second frame surface is in contact with the frame attaching portion, and becomes detachable from the frame attaching portion by being slid.

7. The recording apparatus according to claim 1,
wherein the frame attaching portion includes a restricting portion that restricts a position of the motor mounting frame in a direction parallel to the second frame surface, and
wherein the restricting portion is provided on a deformation portion capable of elastic deformation in a direction that intersects the second frame surface.

8. The recording apparatus according to claim 1,
wherein the motor has a cylindrical portion that projects from the main body portion toward the front side passing the motor mounting frame when the motor is in the attached state.

9. The recording apparatus according to claim 1,
wherein the motor accommodation portion is formed as a recessed portion in which the motor is accommodated,
wherein the motor mounting frame covers the recessed portion when the motor is in the attached state.

10. The recording apparatus according to claim 1,
wherein, the motor accommodation portion is exposed to the user when the frame attaching portion is detached to the second frame surface of the motor mounting frame, viewing form the front side.

* * * * *